United States Patent [19]
Desautels et al.

[11] Patent Number: 5,207,113
[45] Date of Patent: May 4, 1993

[54] SLEEVE FOR ALIGNING TWO DISCRETE STRUCTURES HAVING ADJOINING BORES

[75] Inventors: Thomas P. Desautels, Waterford; Troy O. Culver, Pontiac, both of Mich.

[73] Assignee: Rockwell International Corporation, Pittsburgh, Pa.

[21] Appl. No.: 768,149

[22] Filed: Sep. 30, 1991

[51] Int. Cl.$^5$ .................... F16H 63/36; G05G 5/08
[52] U.S. Cl. .......................... 74/477; 29/464; 29/467; 74/745; 137/625.66; 384/16; 403/13
[58] Field of Search ............ 74/477, 745; 29/464, 29/465, 467; 137/637.1, 625.66; 384/16; 403/13, 14

[56] References Cited

U.S. PATENT DOCUMENTS

| | | | |
|---|---|---|---|
| 1,324,775 | 12/1919 | Henriksen | 384/16 |
| 4,042,305 | 8/1977 | Vincent | 403/14 |
| 4,409,859 | 10/1983 | Yarnell | 74/477 |
| 4,416,562 | 11/1983 | Jöns | 403/13 |
| 4,748,863 | 6/1988 | McNinch, Jr. | 74/477 X |
| 4,793,378 | 12/1988 | Loeffler et al. | 74/745 X |

FOREIGN PATENT DOCUMENTS

| | | | |
|---|---|---|---|
| 1390448 | 4/1988 | U.S.S.R. | 403/13 |
| 1427010 | 3/1976 | United Kingdom | 403/14 |

*Primary Examiner*—Allan D. Herrmann

[57] ABSTRACT

A sleeve which may be used to align a reciprocable member with operations performed in structurally discrete abutting members. The sleeve has coaxial axially extending diametral portions each having different diameters. The juncture of the diametral portions forms an annular face which abuts the outer face of one member when a first diametral portion of the sleeve is placed in a respectively sized bore formed therein. The second abutting member may then be aligned with the first member by locating the respective structure such that a bore formed in the second member receives the second diametral portion of the sleeve. A bore formed in the sleeve may be used to slidingly support a first translatable member. In this manner the respective positions of the abutting structures are established and respectively aligned with a translatable member interacting therebetween.

2 Claims, 1 Drawing Sheet

SLEEVE FOR ALIGNING TWO DISCRETE STRUCTURES HAVING ADJOINING BORES

BACKGROUND OF THE INVENTION

1. Field of the Invention

This invention relates to controls associated with manual transmissions and, more specifically, to techniques to enhance the repeatability with which such controls may be installed on transmissions to provide reliable operation thereof.

2. Description of the Related Art

A manual transmission typically includes a range of gears which may be engaged to accomplish appropriate torque multiplication to provide propulsion of a vehicle. Additional gear ranges may be provided by use of auxiliary transmissions added in series with a primary manual transmission. An example of such an auxiliary transmission is a range transmission which includes a low and high range which provides twice as many gear ranges as are available on the primary transmission.

A primary transmission operated in conjunction with a range transmission must coordinate shift control therebetween. Such coordination typically includes a mechanical interlock feature which prevents a range shifter change from high to low or visa versa if the primary transmission is not in neutral position. The interlock feature is accomplished by use of an interface between the pneumatic valve typically and air spool valve that controls the position of the actuator cylinder of the range shifter and the mechanical linkage manipulated by the driver to select gear ranges. The interlock feature typically involves a pin which is translated from a neutral position to an in-gear position in response to any gear range selection. The pin includes a portion having a tapered end which engages detents formed in a shaft which translates in conjunction with the air spool valve which controls the operation of the range gear selection actuator. The air spool valve and detent shaft have an axis which is oriented orthogonal to the axis along which the pin translates. Establishing a proper aligned relationship between the valve body and the pin is critical to assure reliable operation. Conventionally, alignment of the valve body to the translating pin is accomplished by the alignment achieved via fasteners securing the valve body to the transmission. In such an implementation, the alignment achieved is a function of the tolerance stackup which may result in substantial misalignment of the respective components. Therefore, there is a need to accomplish alignment between the valve body and the transmission case which results in a reliable alignment of the translating pin with the interlock detents in the air spool valve.

SUMMARY OF THE PRESENT INVENTION

The present invention is a sleeve which may be used to align a reciprocable member with operations performed in structurally discrete abutting members. The sleeve has coaxial axially extending diametral portions each having different diameters. The juncture of the diametral portions forms an annular face which abuts the outer face of one member when a first diametral portion of the sleeve is placed in a respectively sized bore formed therein. The second abutting member may then be aligned with the first member by locating the respective structure such that a bore formed in the second member receives the second diametral portion of the sleeve. A bore formed in the sleeve may be used to slidingly support a first translatable member. In this manner the respective positions of the abutting structures are established and respectively aligned with a translatable member interacting therebetween.

The present invention includes an embodiment featuring a sleeve for defining an aligned condition between adjoining first and second structures including a first structure having a first and second face with a first bore defined therebetween, a second structure having a first and second face with a second bore defined therebetween, a sleeve having a first axially extending diametral portion continuously joined with a second coaxial axially extending diametral portion, the sleeve defining a radially extending annular face portion in the region joining the first and second diametral portions, and the first axially extending portion of the sleeve disposed in the first bore with the annular face disposed in abutment with the first face of the first structure and the second axially extending portion of the sleeve disposed in the second bore with the first face of the second structure in abutting relation to the first face of the first structure. The invention further comprises a bore defined in the sleeve coaxial with first and second bores and facilitated to slidably receive a reciprocable member therein.

Another embodiment includes a sleeve for defining an aligned condition for orthogonally oriented first and second reciprocating members supported by discrete first and second structures, the first structure having a first and second face and a first bore defined therebetween, the first bore having a first diameter portion extending from the first face and a second diameter portion extending from the second face forming a first radially extending annular face intermediate the first and second face proximate the second face, the first reciprocating member having a first axially extending diametral portion joining a second axially extending diametral portion having a radially extending flange member disposed therebetween forming first and second opposed radially extending annular faces, the first annular face of the first reciprocating member compliantly disposed in abutting relation with the radially extending annular face of the first bore, the second structure having a first bore disposed in orthogonal relation to the first bore of the first structure and slidingly supporting the second reciprocating member, the second reciprocating member having a plurality of axially disposed indentation defined therein, the second structure having a second bore which may be selectively disposed in axial alignment with a major axis defined through the first bore of the first structure and the first bore of the second structure and having a diameter different than the first diameter portion of the first bore of the first structure, a sleeve having a first axially extending diametral portion engaged with a second coaxial axially extending diametral portion, the sleeve defining a bore coaxial with the first and second diametral portions in which the first axially extending diametral portions of the first reciprocating member is slidingly carried so as to selectively engage one of the plurality of axially disposed indentations, the sleeve defining a second radially extending annular face portion in the region joining the first and second diameter portions, the first axially extending portion of the sleeve disposed in the first bore of the first structure with the second annular face disposed in abutting relation with the first face of the first structure, and the second axially extending portion of the sleeve disposed in the second bore of the second structure defined in the second reciprocating member.

The present invention features an embodiment for use in a selectable gear range control system including a primary transmission having a neutral and a first range of gears which may be selected by means of a first control and an auxiliary transmission having a second range of gears including high and low which may be selected by means of a second control including an interlock system which prevents a shift of the auxiliary transmission if the primary transmission is not in neutral position including a neutral check shaft which occupies a first position if the primary transmission is in neutral and a second axially displaced position if the first control has selected a first range of gears, an actuator having a first and second position which may be selectably controlled to position the auxiliary transmission in low or high range, a spool valve having a first bore for reciprocation of a control spool and a second bore for reciprocation of an interlock spool, the interlock spool being displaceable in coordination with the control spool occupying a first position if the auxiliary transmission is in low range and a second position if the auxiliary transmission is in high range, the interlock spool having a first and second detent formed therein, a translating pin which is displaceable along a major axis of and in response to axial displacement of the neutral check shaft in such a manner as to engage the first detent if the auxiliary transmission is in low and a second detent if the auxiliary transmission is in high so as to prevent the auxiliary transmission from shifting from low to high and high to low if the primary transmission is not in neutral position, a sleeve having a first axially extending diametral portion engaged with a second coaxial axially extending diametral portion, the sleeve defining a bore in which the translating pin is supported for reciprocation, and the spool valve and the primary transmission defining respective bores adapted to receive respective diametral portions of the sleeve so as to align the bores and define the axis along which the translating pin reciprocates.

These and other aspects of the present invention will become more readily apparent by reference to the following detailed description of the embodiments as shown in the drawings.

DETAILED DESCRIPTION OF THE PREFERRED EMBODIMENT

Figures 1, 2, 3:
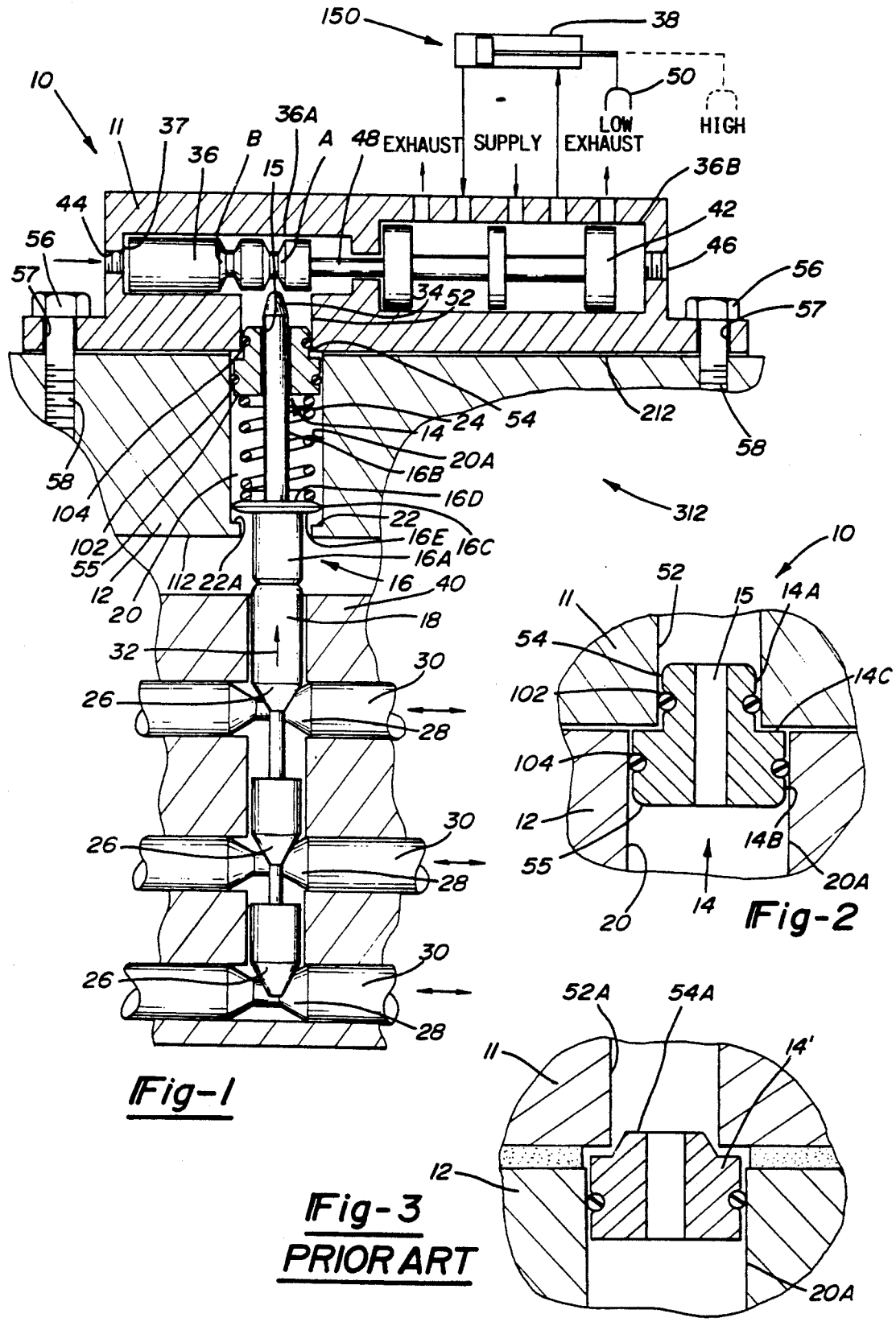
FIG. 1 is a schematic view of the components of the present invention.
FIG. 2 is a cross-section of the sleeve of the present invention.
FIG. 3 is a cross-section of the sleeve used in a conventional transmission.

The preferred embodiment of the present invention as shown in FIG. 1 is adapted to secure a slave valve assembly 10 to a primary transmission 312 at case 12 using guide sleeve 14 to provide proper alignment therebetween. Transmission case 12 includes face portions 112 and 212. Guide sleeve 14 also functions to define a bore 15 through which translating pin 16 reciprocates in reaction to forces imparted by neutral check shaft 18. Sleeve 14 has a first axially extending diametral portion 14A engaged with a second coaxially extending diametral portion 14B. The sleeve includes a second radially extending annular face portion 14C in the region joining portions 14A, 14B. Bore 20 in transmission case 12 includes a reduced diameter section 22 which provides a stop at annular face 22A for translating pin 16. The remaining portions of bore 20 features diameter 20A. Translating pin 16 includes a first axially extending diametral portion 16A and a second axially extending diametral portion 16B joined at a radially extending flange member 16C forming first 16D and second 16E opposed radially extending annular faces. Spring 24 defines a bias acting upon translating pin 16, thereby maintaining translating pin 16 in constant contact with neutral check shaft 18. Neutral check shaft 18 includes three cam profiles 26 formed thereon. Cam profiles 26 interact with respective cam profiles 28 formed in three respectively engaged shifter shafts 30. Shifter shafts 30 are mechanically linked to a transmission gear range selector which may be selectively positioned manually by a driver so as to translate shifting forks (not shown) causing respective gears to engage to effect a gear range selection. Thus, any one or more of shafts 30 may be positioned in a position translated from that shown as neutral position, thereby causing interaction of any one of cam profiles 26, 28 to cause translation of neutral check shaft 18 in a direction shown by arrow 32. Neutral check shaft 18 imparts a force against translating pin 16 which compresses spring 24 and causes portion 34 of translating pin 16 to engage detents formed in interlock spool 36. Interlock detent A is appropriate for engagement with portion 34 of translating pin 16 to assure range shifter 38 does not shift from low to high unless portion 34 of translating pin 16 is retracted by returning neutral check shaft 18 to neutral position. Interlock detent B is appropriate for engagement with portion 34 of translating pin 16 to assure range shifter 38 does not shift from high to low unless portion 34 of translating pin 16 is retracted by returning neutral check shaft 18 to neutral position. The interlock spool 36 and air switch spool 42 are positioned within slave valve body 11 by the interaction of compressed air supplied through port 44 and/or port 46. Compressed air is continuously supplied to port 44 and selectively supplied to port 46 by actuation of a switch that controls the range shifter. The differential in piston area against which the compressed air acts between interlock spool 36 versus the larger piston offered by air switch spool 42 results in a force which causes translation of spools 36, 42 to the left, as shown in FIG. 1. Pusher 48 defines a mechanical connection between spools 36, 42. If high range mode is desired, the air supply is relieved from port 46 and maintained at port 44, thereby causing a shift of spools 36, 42 to the right, as shown in FIG. 1. Air switch spool 42 will function in a conventional manner to control the supply of air to range shift actuator 38, effecting a translation of range shift fork 50 of auxiliary transmission 150 to accomplish low or high range. As has been previously described, the translation of spools 36 and 42 is disabled by mechanical interference between portion 34 of translating pin 16 and either detent A or B. In this manner the range shift function is disabled, preventing shift between high and low and vice versa whenever the transmission is not in neutral position.

The assembly of the slave valve assembly 10 to transmission case 12 is accomplished by installing guide sleeve 14 in bore 52. Next, bore 20 of slave valve assembly 10 is aligned with section 55 of guide sleeve 14. O-ring 102 and 104 provide a compliant sealing relation between the respective sleeve portions and bores. Then, fasteners 56 are engaged with respective threaded openings 58 defined in transmission case 12. A conventional guide sleeve 14', shown in FIG. 3, features a tapered reduced diameter section 54A which does not feature a close fit with bore 52A of slave valve assembly 10 and thus no respective alignment is accomplished between bore 20A and bore 52A. In such an assembly the respective alignment is a function of the accuracy with which components may be manufactured to a close tolerance. As one skilled in the art may note, the tolerance stackup of the assembly shown in FIG. 1 utilizing a sleeve as shown in FIG. 3 consists of the tolerance associated with the location and size of threaded holes 58, the diametral tolerance of fasteners 56 and openings 57, the tolerance of the dimension between opening 57 and end wall 37, and the tolerance of the dimension from the end of interlock spool 36 to the center of detent A and/or B. The tolerance stack of the assembly shown in FIG. 1 incorporating a sleeve as shown in FIG. 2, includes the tolerance between bore 52 and end wall 37, and the tolerance between the end of interlock spool 36 and detents A and/or B. It is clear that fewer manufacturing tolerances are involved in the tolerance stack of the present invention, thereby assuring the capability of repeatable alignment between the slave valve assembly and the transmission case.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

We claim:

1. An apparatus for defining an aligned condition for orthogonally oriented first 16 and second 36 reciprocating members supported by discrete first 12 and second structures 11, said first structure having a first face 112 and second face 212 and a first bore 20 defined therebetween, said first bore 20 having a first diameter portion 22 extending from said first face and a second diameter portion 20A extending from said second face forming a first radially extending annular face 22A intermediate said first and second face proximate said second face, said first reciprocating member having a first axially extending diametral portion 16A joining a second axially extending diametral portion 16B having a radially extending flange member 16C disposed therebetween forming first 16D and second 16E opposed radially extending annular faces, said second annular face 16E of said first reciprocating member 16 compliantly disposed in abutting relation with said radially extending annular face 22A of said first bore 20, said second structure 11 having a first bore 36A disposed in orthogonal relation to said first bore 20 of first structure 12 and slidingly supporting said second reciprocating member 36, said second reciprocating member 36 having a plurality of axially disposed indentations A,B defined therein, said second structure 11 having a second bore 52 which may be selectively disposed in axial alignment with a major axis defined through said first bore 20 of said first structure 12 and oriented orthogonal to said first bore 36A of said second structure 11 and having a diameter different than said first diameter portion 20A of said first bore 20 of said first structure 11 wherein the improvement comprises:

a sleeve 14 having a first axially extending diametral portion 14A engaged with a second coaxial axially extending diametral portion 14B;

said sleeve 14 defining a bore 15 coaxial with said first and second diametral portions in which said second axially extending diametral portion (14C) 16B of said first (14A) reciprocating member 16 is slidingly carried so as to selectively engage one of said plurality of axially disposed indentations A,B;

said sleeve 14 defining a second radially extending annular face portion in the region joining said first and second diameter portions;

said first axially extending portion 14B of said sleeve 14 disposed in said first bore 20 of said second structure 12 with said annular face portion 14C disposed in abutting relation with said second structure 11; and said second axially extending portion 14A of said sleeve 14 disposed in said second bore 52 of said first structure 11.

2. In a selectable gear range control system 10 including a primary transmission 312 having a neutral and a first range of gears which may be selected by means of a first control 30 and an auxiliary transmission 150 having a second range of gears including high and low which may be selected by means of a second control 50 including an interlock system which prevents a shift of said auxiliary transmission 150 if said primary transmission 312 is not in neutral position including a neutral check shaft 18 which occupies a first position if said primary transmission 312 is in neutral and a second axially displaced position if said first control has selected a first range of gears, an actuator 38 having a first and second position which may be selectably controlled to position said auxiliary transmission 150 in low or high range, a spool valve having a first bore for reciprocation of a control spool and a second bore for reciprocaion of an interlock spool, said interlock spool being displaceable in coordination with said control spool occupying a first position if said auxiliary transmission is in low range and a second position if said auxiliary transmission is in high range, said interlock spool 36 having a first and second detent A,B formed therein, a translating pin 16 which is displaceable along a major axis of and in response to axial displacement of said neutral check shaft 18 in such a manner as to engage said first detent A if said auxiliary transmission is in low and a second detent B if said auxiliary transmission is in high so as to prevent said auxiliary transmission from shifting from low to high and high to low if said primary transmission is not in neutral position wherein the improvement comprises:

a sleeve having a first axially extending diametral portion 14A engaged with a second coaxial axially extending diametral portion 14B;

said sleeve defining a bore 15 in which said translating pin 16 is supported for reciprocation; and said spool valve and said primary transmission defining respective bores adapted to receive respective diametral portions of said sleeve so as to align said bores and define the axis along which said translating pin reciprocates.

* * * * *